(No Model.)
F. F. WEBER.
MIRROR.
No. 299,304. Patented May 27, 1884.
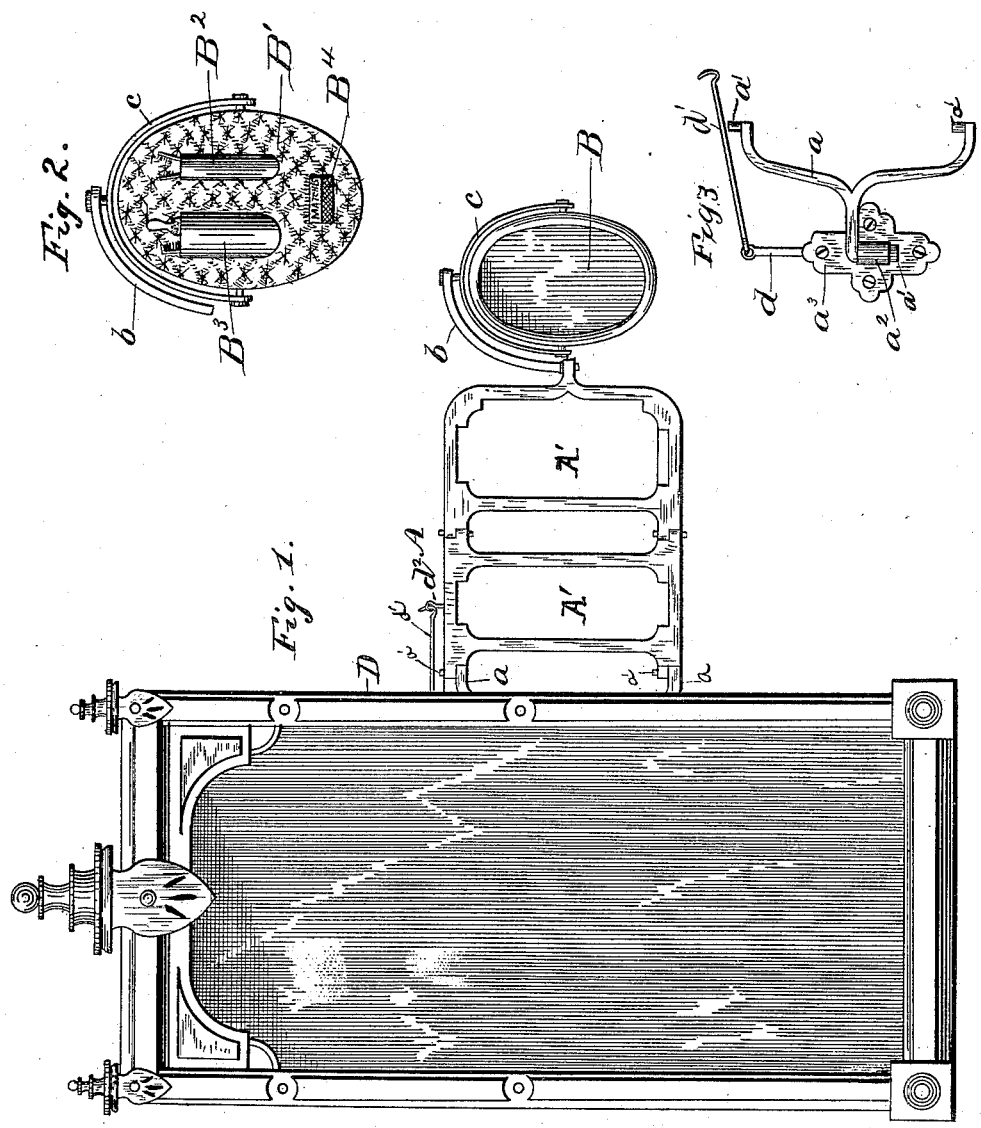
WITNESSES
Chas. R. Burr
W. E. Bowen
INVENTOR
Frank F. Weber
By Myers & Co.
Attorneys

UNITED STATES PATENT OFFICE.

FRANK F. WEBER, OF ATLANTA, ILLINOIS.

MIRROR.

SPECIFICATION forming part of Letters Patent No. 299,304, dated May 27, 1884.

Application filed August 21, 1883. (No model.)

*To all whom it may concern:*

Be it known that I, FRANK F. WEBER, a citizen of the United States of America, residing at Atlanta, in the county of Logan and State of Illinois, have invented certain new and useful Improvements in Mirrors, of which the following is a specification, reference being had therein to the accompanying drawings.

This invention has for its object to provide a folding or extensible bracket specially designed for supplementary mirrors arranged for use in connection with a principal mirror, to enable the person making his or her toilet to obtain a back view, as also a front view, as is desired particularly in dressing the hair.

It has also for its object to provide for conveniently holding the articles used to assist in making the toilet—as combs, brushes, &c.—and for holding pins, tooth-brush, &c.

The invention consists of a bracket composed of a series of articulated or hinged sections with a mirror hung in a frame swiveled to one of said bracket-sections, substantially as hereinafter more fully set forth and claimed.

In the accompanying drawings, Figure 1 is a front view of my improved bracket as applied to a large or principal mirror. Fig. 2 is a rear view of the small mirror, and Fig. 3 is a detailed view of the bracket-hinge and hook.

In the embodiment of my invention I construct the bracket A of a series of sections or separate frames, A', of metal, which are hinged or articulated together by a knuckle-joint or pintle-hinge, as shown in Fig. 1. The inner end bracket-section is hinged by an arm, $a$, with a downwardly-projecting projection or pintle, $a'$, fitting in an eye, $a^2$, of a plate, $a^3$, screwed or fastened (it may be) to the wall or side of the large mirror-frame, as shown in Fig. 1. These bracket-sections are thus enabled to be extended or folded, the function of which will appear farther on. To the outer end bracket-section is pivoted or hinged a davit-shaped narrow plate or arm, $b$, to the upper end of which is swiveled a semicircular frame, $c$. Between the ends of this frame is hung or pivoted the small mirror B, which, by means of the folding and extensible bracket, is adapted to be removed the required distance from the principal or large mirror D to the rear of the person standing in front of and contiguous to the large mirror, whereby the imaged back view of the person therein will be imaged in the large mirror, the latter being deflected or adjusted at the required angle to that of the small mirror to secure that end. The inner end bracket-section socket or plate has an upward extension, $d$, to which is connected a hook, $d'$, which hooks into staple $d^2$, for holding the brackets in an extended position when the mirror is in use.

The back of the small mirror B is cushioned to serve as a pin and needle cushion, B', and has also affixed to it a tooth-brush holder, $B^2$, a comb, brush, &c., holder, $B^3$, and a match-safe, $B^4$, which afford great conveniences while making the toilet.

Having thus fully described my invention, I claim and desire to secure by Letters Patent—

1. In a mirror, the combination of the mirror D, arm $a$, plate $a^3$, having eye $a^2$, hook $d'$, for holding the bracket-sections in an extended position, bracket A, arm $b$, and mirror B, having frame C, substantially as shown, and for the purpose described.

2. The combination of the mirror D, the bracket mechanism for adjustably connecting it with mirror B, and the hook for holding the bracket-sections in an extended position, substantially as shown, and for the purpose described.

In testimony whereof I affix my signature in presence of two witnesses.

FRANK F. WEBER.

Witnesses:
A. E. CHURCH,
L. T. RANSDELL.